(12) United States Patent  
DeLuca

(10) Patent No.: US 8,638,919 B2  
(45) Date of Patent: Jan. 28, 2014

(54) EXTERNAL MESSAGING DURING CONFERENCE CALL

(75) Inventor: Lisa Seacat DeLuca, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 9 days.

(21) Appl. No.: 13/484,747

(22) Filed: May 31, 2012

(65) Prior Publication Data

US 2013/0322610 A1 Dec. 5, 2013

(51) Int. Cl.  
*H04M 3/42* (2006.01)

(52) U.S. Cl.  
USPC ............ 379/204.01; 370/260; 709/204

(58) Field of Classification Search  
USPC .......... 379/202.01, 204.01; 370/260; 709/204  
See application file for complete search history.

(56) References Cited

U.S. PATENT DOCUMENTS

| | | | |
|---|---|---|---|
| 7,221,951 B2 | 5/2007 | Anvekar et al. | |
| 7,478,129 B1 * | 1/2009 | Chemtob | 709/204 |
| 7,685,235 B2 * | 3/2010 | Curran et al. | 709/205 |
| 7,881,447 B1 | 2/2011 | Satapathy et al. | |
| 2007/0156811 A1 | 7/2007 | Jain et al. | |
| 2010/0189240 A1 | 7/2010 | Miller et al. | |
| 2011/0075820 A1 * | 3/2011 | Mikan et al. | 379/88.13 |
| 2012/0182384 A1 * | 7/2012 | Anderson et al. | 348/14.09 |

* cited by examiner

*Primary Examiner* — Creighton Smith  
(74) *Attorney, Agent, or Firm* — Matthew Chung; Hoffman Warnick LLC

(57) ABSTRACT

A solution for enabling a participant to a conference call to obtain contact information for other participants to the conference call in order to send an external message to one or more of the other participants is provided. The contact information can be used by a messaging system, which is available to the participant independent of the conference call, to transmit the external message for presentation to the other participant(s).

16 Claims, 2 Drawing Sheets

EXTERNAL MESSAGING DURING CONFERENCE CALL

TECHNICAL FIELD

The disclosure relates generally to managing conference calls, and more particularly, to enabling a party to use an external messaging solution with other parties to the conference call during the conference call.

BACKGROUND ART

During a conference call, a participant may desire to share information, such as an address, with the other participants. Oftentimes, the participant will simply speak the information during the conference call. However, this may require the other participants to accurately record what the participant stated. Alternatively, the participant can use another communications approach, such as electronic mail, during the conference call.

Some approaches seek to allow a conference call participant to communicate with other participants using an alternative communications solution, e.g., a chat based session, such as instant messaging. To date, these approaches provide centralized control by the conference call system and/or assume that the participant has the necessary contact information for the other participants.

SUMMARY OF THE INVENTION

Aspects of the invention provide a solution for enabling a participant to a conference call to obtain contact information for other participants to the conference call in order to send an external message to one or more of the other participants. The contact information can be used by a messaging system, which is available to the participant independent of the conference call, to transmit the external message for presentation to the other participant(s).

A first aspect of the invention provides a computer-implemented method of managing a conference call, the method comprising: receiving a request to send an external message to a set of other participants to the conference call from a first participant device of a first participant to the conference call; and sending a response to the request to the first participant device, wherein the response includes external contact information for use by the first participant device in transmitting the external message to a device associated with at least one of the set of other participants using a messaging system available independent of the conference call.

A second aspect of the invention provides a method comprising: sending, from a computing device while the computing device is connected to a conference call, a request to send an external message to a set of other participants to the conference call for processing by a conference call system managing the conference call; and receiving, on the computing device, a response to the request from the conference call system, wherein the response includes external contact information for use in sending the external message to at least one of the set of other participants using a messaging system available to the computing device independent of the conference call.

A third aspect of the invention provides a system comprising: a computer system for managing a conference call by performing a method comprising: receiving a request to send an external message to a set of other participants to the conference call from a first participant device of a first participant to the conference call; and sending a response to the request to the first participant device, wherein the response includes external contact information for use by the first participant device in transmitting the external message to a device associated with at least one of the set of other participants using a messaging system available independent of the conference call.

Other aspects of the invention provide methods, systems, program products, and methods of using and generating each, which include and/or implement some or all of the actions described herein. The illustrative aspects of the invention are designed to solve one or more of the problems herein described and/or one or more other problems not discussed.

BRIEF DESCRIPTION OF THE DRAWINGS

These and other features of the disclosure will be more readily understood from the following detailed description of the various aspects of the invention taken in conjunction with the accompanying drawings that depict various aspects of the invention.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, aspects of the invention provide a solution for enabling a participant to a conference call to obtain contact information for other participants to the conference call in order to send an external message to one or more of the other participants. The contact information can be used by a messaging system, which is available to the participant independent of the conference call, to transmit the external message for presentation to the other participant(s). As used herein, unless otherwise noted, the term "set" means one or more (i.e., at least one) and the phrase "any solution" means any now known or later developed solution.

Figure 1:
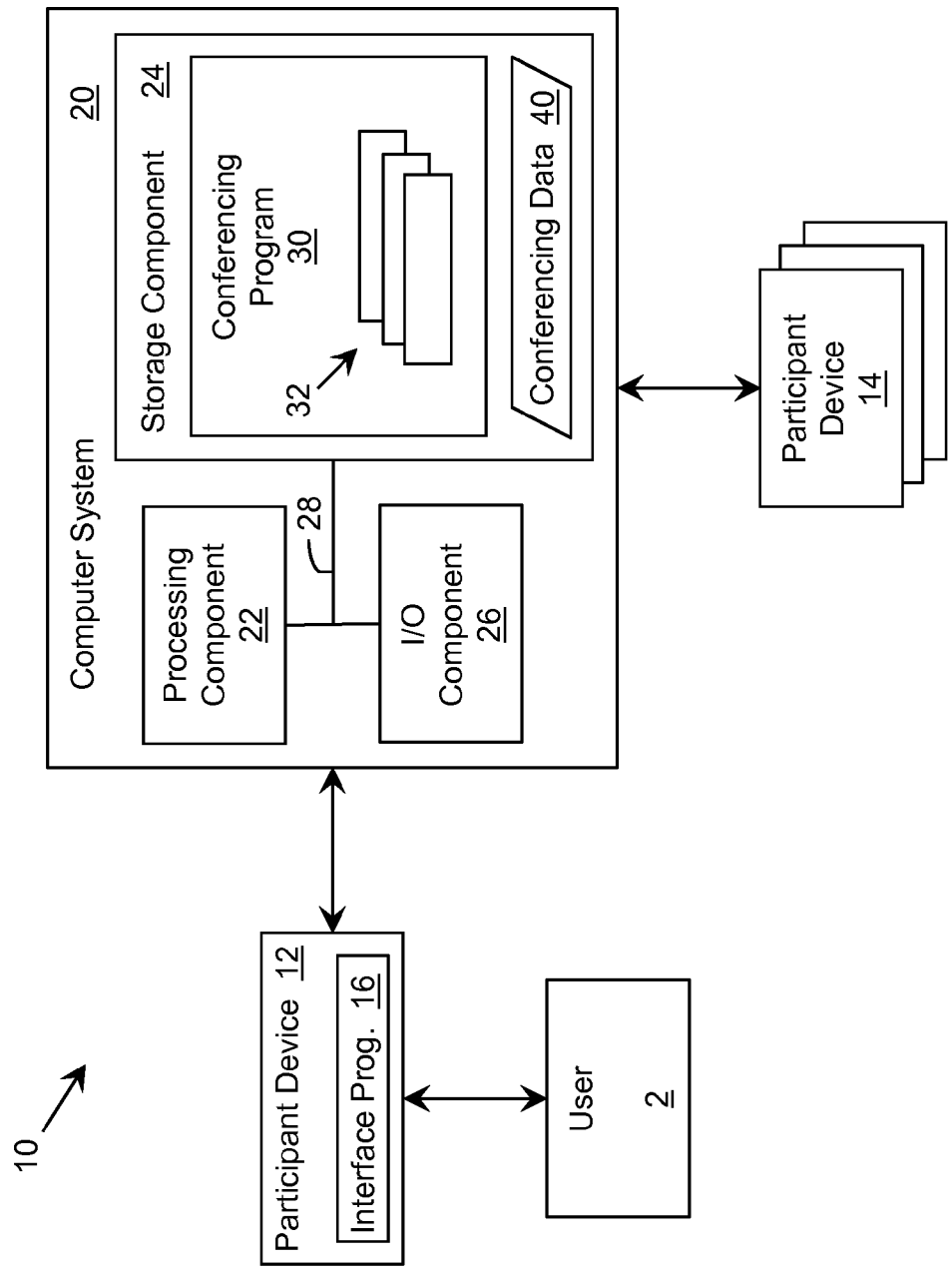
FIG. 1 shows an illustrative environment for managing a conference call according to an embodiment.

Turning to the drawings, FIG. 1 shows an illustrative environment 10 for managing a conference call according to an embodiment. To this extent, environment 10 includes a computer system 20 that can perform a process described herein in order to manage a conference call including a plurality of participant devices 12, 14 connected thereto. In particular, the computer system 20 is shown including a conferencing program 30, which makes the computer system 20 operable to manage the conference call by performing a process described herein. Furthermore, a participant device 12 is shown including an interface program 16, which enables a corresponding user 2 to participate in the conference call by performing a process described herein.

The computer system 20 is shown including a processing component 22 (e.g., one or more processors), a storage component 24 (e.g., a storage hierarchy), an input/output (I/O) component 26 (e.g., one or more I/O interfaces and/or devices), and a communications pathway 28. In general, the processing component 22 executes program code, such as the conferencing program 30, which is at least partially fixed in the storage component 24. While executing program code, the processing component 22 can process data, which can result in reading and/or writing transformed data from/to the storage component 24 and/or the I/O component 26 for further processing.

The pathway 28 provides a communications link between each of the components in the computer system 20. The I/O component 26 can comprise one or more human I/O devices, which enable a human user (not shown) to interact with the computer system 20 and/or one or more communications devices to enable a system user, such as the participant devices 12, 14, to communicate with the computer system 20 using any type of communications link. To this extent, the conferencing program 30 can enable the computer system 20 to manage a set of interfaces (e.g., graphical user interface(s), application program interface, and/or the like) that enable human and/or system users to interact with the computer system 20. Furthermore, the conferencing program 30 can enable the computer system 20 to manage (e.g., store, retrieve, create, manipulate, organize, present, etc.) the data, such as conferencing data 40, using any solution.

In any event, the computer system 20 can comprise one or more general purpose computing articles of manufacture (e.g., computing devices) capable of executing program code, such as the conferencing program 30, installed thereon. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. To this extent, the conferencing program 30 can be embodied as any combination of system software and/or application software.

Furthermore, the conferencing program 30 can be implemented using a set of modules, such as the set of modules 32 shown in conjunction with the conferencing program 30. In this case, a module 32 can enable the computer system 20 to perform a set of tasks used by the conferencing program 30, and can be separately developed and/or implemented apart from other portions of the conferencing program 30. As used herein, the term "component" means any configuration of hardware, with or without software, which implements the functionality described in conjunction therewith using any solution, while the term "module" means program code that enables a computer system 20 to implement the actions described in conjunction therewith using any solution. When fixed in a storage component 24 of a computer system 20 that includes a processing component 22, a module is a substantial portion of a component that implements the actions. Regardless, it is understood that two or more components, modules, and/or systems may share some/all of their respective hardware and/or software. Furthermore, it is understood that some of the functionality discussed herein may not be implemented or additional functionality may be included as part of the computer system 20.

When the computer system 20 comprises multiple computing devices, each computing device can have only a portion of the conferencing program 30 fixed thereon (e.g., one or more modules 32). However, it is understood that the computer system 20 and the conferencing program 30 are only representative of various possible equivalent computer systems that may perform a process described herein. To this extent, in other embodiments, the functionality provided by the computer system 20 and the conferencing program 30 can be at least partially implemented by one or more computing devices that include any combination of general and/or specific purpose hardware with or without program code. In each embodiment, the hardware and program code, if included, can be created using standard engineering and programming techniques, respectively.

Regardless, when the computer system 20 includes multiple computing devices, the computing devices can communicate over any type of communications link. Furthermore, while performing a process described herein, the computer system 20 can communicate with one or more other computer systems, such as the participant devices 12, 14, using any type of communications link. In either case, the communications link can comprise any combination of various types of optical fiber, wired, and/or wireless links; comprise any combination of one or more types of networks; and/or utilize any combination of various types of transmission techniques and protocols.

It is understood that each participant device 12, 14 can be configured similar to the computer system 20. Similarly, it is understood that the interface program 16 can be implemented similar to the conferencing program 30. While only the participant device 12 is shown including the interface program 16, it is understood that any combination of zero or more of the participant devices 12, 14 can include the interface program 16 in various embodiments.

As discussed herein, the conferencing program 30 enables the computer system 20 to manage a conference call including a plurality of participant devices 12, 14, each of which enables a corresponding participant, such as user 2, to participate in the conference call. To this extent, the computer system 20 can receive a request to create a conference call, join a conference call, be a leader of a conference call, and/or the like, from one or more of the participant devices 12, 14, which the computer system 20 can process using any solution. While processing the various requests, the computer system 20 can generate and update conferencing data 40, which can include user 2 information, contact information for the participant devices 12, 14 to a conference call, information for payment for the conference call service, attribute data for the conference call (e.g., start/end times, duration, number of participants, etc.), and/or the like.

In an embodiment, the conferencing data 40 includes information for one or more of the users 2, which the computer system 20 can obtain using any solution. For example, a user 2 can register with the computer system 20 in order to participate in/manage a conference call using the computer system 20. The conferencing data 40 can include data for the user 2, such as name information, contact information for his/her participant device 12, contact information for one or more additional devices associated with the user 2, and/or the like. Furthermore, the conferencing data 40 can include message contact information for the user 2. The message contact information can comprise information that can be used to communicate with the user 2 using a messaging system available independent of the conference call. The messaging system can enable a user to generate and send any type of message, such as a text-based message, a media-based message, an audio-based message, and/or the like. In general, the messaging system can be configured to deliver the message directly to a destination device without requiring a telephonic or other type of dedicated connection between the source and destination devices. Illustrative messaging systems include text messaging (e.g., short message service (SMS)), electronic mail, instant messaging, multimedia messaging (e.g., multimedia messaging service (MMS)), and/or the like. To this extent, illustrative message contact information can include a telephone number (e.g., of the participant device 12), an email address, an instant messaging address, and/or the like. Additionally, the conferencing data 40 can include one or more preferences of the user 2, e.g., whether the user 2 desires to receive, not receive, or be prompted as to whether to receive an external message sent by another participant using a messaging system, whether the user 2 desires his/her information to remain confidential or allow it to be shared with other participants, and/or the like.

Figure 2:
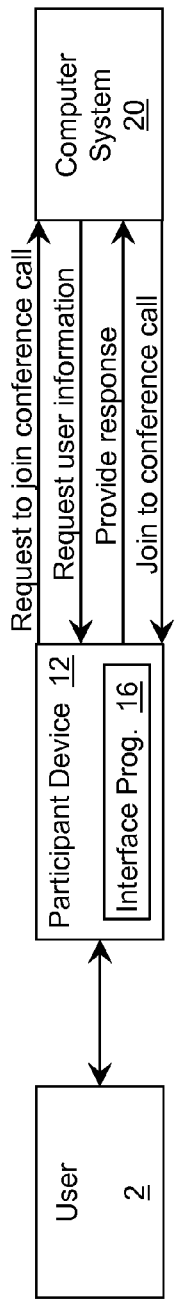
FIG. 2 shows an illustrative communications flow while a user connects to a conference call according to an embodiment.

The computer system 20 can acquire the user data for a user 2 using any solution. For example, FIG. 2 shows an illustrative communications flow while a user 2 connects to a conference call according to an embodiment. Initially, the user 2 uses his/her corresponding participant device 12 to connect to the computer system 20, e.g., via a call-in number, conference call access code, and/or the like, to request to join the conference call being managed by the computer system 20. Prior to joining the participant device 12 to the conference call, the computer system 20 can send a request for user information to the participant device 12. In response, the user 2 can use the participant device 12 (e.g., via the interface program 16) to provide a response. The computer system 20 can request and the user 2 can provide any combination of the user data described herein. In an embodiment, the computer system 20 requests that the user 2 provide/confirm his/her message contact information and/or one or more preferences for receiving external messages. In response, the user 2 can use the participant device 12 to send a response that declines to provide the message contact information, includes data corresponding to the message contact information, data corresponding to a preference for receiving external messages (e.g., keep contact information anonymous), and/or the like. Regardless, upon receiving the response, the computer system 20 can join the participant device 12 to the conference call using any solution.

The request for user information provided by the computer system 20 can be in any of various forms. For example, the computer system 20 can inquire as to whether the user 2 would like to use the telephone number for the participant device 12 as the message contact information or provide alternative contact information for the message contact information. Furthermore, the computer system 20 can obtain additional information from the user (e.g., using one or more additional requests). For example, the computer system 20 can inquire as to whether the user 2 would like to receive, not receive, or be prompted to receive external messages using a messaging system, whether the user would like his/her message contact information to be maintained in private by the computer system 20 or transmitted to other participant devices 14 (FIG. 1), and/or the like. It is understood that the computer system 20 can obtain the message contact information using various alternative solutions. For example, users can register with the computer system 20 prior to participating in a conference call. As part of the registration, the computer system 20 can obtain the message contact information, preferences, additional information (e.g., name, alternative contact information, etc.), and/or the like, using any solution. Furthermore, the computer system 20 can obtain the message contact information only in response to receiving a request from a participant of a conference call to send an external message to the other participants.

Figure 3:
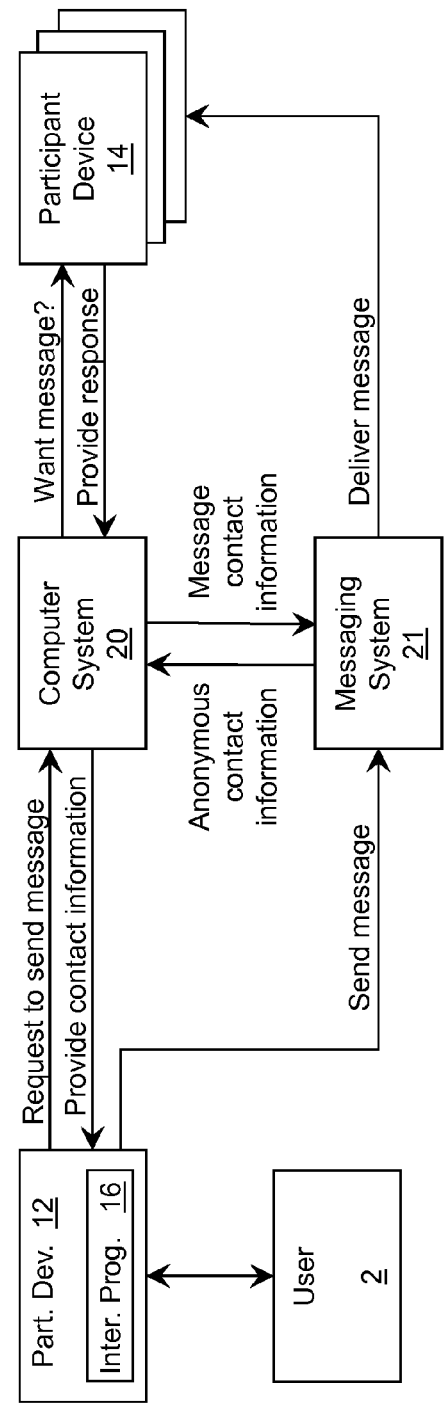
FIG. 3 shows an illustrative communications flow of a participant communicating with one or more other participants using a messaging system according to an embodiment.

In any event, while managing a conference call including a plurality of participants, the computer system 20 can enable a participant to communicate with one or more other participants to the conference call using a messaging system available independent of the conference call. To this extent, FIG. 3 shows an illustrative communications flow of a participant communicating with one or more other participants using a messaging system 21 according to an embodiment. It is understood that the messaging system 21 can comprise any type of system for enabling communications between two or more users using a messaging solution, such as a messaging solution configured to deliver the message directly to a destination device without requiring a telephonic or other type of dedicated connection between the source and destination devices. Furthermore, the messaging system 21 can be configured to translate messages between formats, e.g., based on the functionality supported by the destination device, the message contact information, a designated preference, and/or the like.

Initially, the user 2 can request to send an external message to one or more of the other participants to a conference call being managed by the computer system 20. The user 2 can generate and send the request to the computer system 20 using his/her participant device 12 using any solution. For example, in an embodiment, the interface program 16 can enable the participant device 12 to manage a user interface control, which enables the user 2 to generate the request and transmit the request for processing by the computer system 20. Alternatively, the user 2 can enter a command using the participant device 12, which is transmitted directly for processing by the computer system 20. The request can be any type of request, including, for example, a data message, a vertical service code (VSC, also referred to as a star code), a pound code, an audible (e.g., spoken) command, and/or the like.

In any event, in response to receiving the request, the computer system 20 can determine the other participant(s) associated with the conference call and obtain contact information for one or more of the other participants using any solution, which can be provided to the participant device 12 in response to the request. The computer system 20 can limit potential recipients of the external message to those participants currently connected to the conference call, or can include other participants that are not currently connected to the conference call (e.g., previously left call or were assigned to conference call but have not yet joined). As described herein, the contact information can include data that enables the user 2 to communicate with one or more of the other participants using a messaging system 21 available independent of the conference call. For example, the contact information can include message contact information, such as a telephone number for a participant device 14, a telephone number for an alternative telephonic device of a participant, an instant messaging identifier, an email address, and/or the like. The computer system 20 can obtain the contact information from conferencing data 40 (FIG. 1) previously obtained for a participant. Alternatively, the computer system 20 can obtain the contact information for one or more participants in response to receiving the request.

The contact information for a participant can be anonymous contact information. The anonymous contact information can enable the user 2 to send an external message to the participant using the messaging system 21, but will not provide the message contact information (e.g., telephone number) used in the transmission of the external message to the participant's corresponding device, such as a participant device 14. In this manner, the participant can receive the external message without providing his/her contact information to the sending user 2. For example, the anonymous contact information can include a code or other type of information, which can be used by the messaging system 21 to obtain from the computer system 20 the message contact information for the participant when transmitting the external message.

Furthermore, the computer system 20 can determine whether each of the other participants desires to receive the external message using any solution. For example, the computer system 20 can automatically use data stored in the conferencing data 40 to determine whether the participant wants to receive the external message. Additionally, the computer system 20 can inquire whether a participant desires to receive the external message. In this case, the computer system 20 can transmit a message desired inquiry for presentation on the participant device 14 (e.g., display on a screen, audible message, and/or the like) for a participant. The participant can respond to the inquiry using his/her participant device 14 using any solution (e.g., using a keypad, audible response, and/or the like). The computer system 20 can wait a fixed period of time to receive a response from a participant before using a default action (e.g., not providing contact information, a default action specified in the conferencing data 40, and/or the like).

The computer system 20 can send a response to the request for processing by the participant device 12 of the user 2 using any solution. The response can include the contact information, which can be message contact information or anonymous contact information, for one or more of the participants to the conference call. In addition, the computer system 20 can provide additional information for one or more of the participants. For example, the additional information can include name information for the participant, alternative contact information (e.g., email address, telephone number, mailing address, and/or the like), and/or the like. The additional information can be used by the user 2 to add the other participant to his/her contact database, which can be stored on the participant device 12.

When the user 2 indicates a desire to send an external message, the participant device 12 (e.g., the interface program 16 executing thereon) can automatically initiate preparation of the external message while the participant device 12 remains connected to the conference call. For example, a message preparation application (e.g., a text message application, an e-mail application, and/or the like) can be initiated to enable the user to create the external message, e.g., in response to receiving contact information from the computer system 20. Furthermore, the participant device 12 (e.g., the interface program 16 executing thereon) can automatically designate a set of destination contacts for the external message using the contact information received from the computer system 20. In particular, in response to receiving contact information from the computer system 20, the participant device 12 can automatically provide some or all of the contact information to the message preparation application, which can automatically add the contact information to a list of destination contacts for the external message being created. In an embodiment, the participant device 12 can enable the user 2 to selectively remove, not add, edit, and/or the like, the contact information for one or more of the other participants using any solution (e.g., by prompting the user 2 prior to adding the information, enabling the user to edit the destination contact(s), and/or the like).

The user 2 can create the external message using any solution (e.g., typing text, speaking a message, inserting predefined text, and/or the like). Furthermore, the user 2 can add and/or remove other recipients for the external message, which are not associated with the conference call. Regardless, once the user 2 has completed composing the message, the user 2 can request that the external message be sent to the set of destination contacts. In response, the participant device 12 can transmit the external message for processing by the messaging system 21.

Upon receiving the external message, the messaging system 21 can use the contact information for each destination contact to transmit the message to the corresponding device, such as a participant device 14, using any solution. As described herein, the contact information for one or more of the destination contacts can include anonymous contact information. In this case, the messaging system 21 can use the anonymous contact information to request the message contact information for the destination device from the computer system 20. In particular, the anonymous contact information can include contact information that enables the messaging system 21 to communicate with the computer system 20 and provide identification information that uniquely identifies the destination contact on the computer system 20. In response to receiving the request, the computer system 20 can obtain the message contact information for the destination contact and provide the message contact information in a response transmitted for processing by the messaging system 21. It is understood that the message contact information for multiple destination contacts of an external message can be obtained by the messaging system 21 using a single request or multiple requests.

While shown and described herein as a method and system for managing a conference call, it is understood that aspects of the invention further provide various alternative embodiments. For example, in one embodiment, the invention provides a computer program fixed in at least one computer-readable medium, which when executed, enables a computer system to manage a conference call. To this extent, the computer-readable medium includes program code, such as conferencing program 30 (FIG. 1), which enables a computer system to implement some or all of a process described herein. It is understood that the term "computer-readable medium" comprises one or more of any type of tangible medium of expression, now known or later developed, from which a copy of the program code can be perceived, reproduced, or otherwise communicated by a computing device. For example, the computer-readable medium can comprise: one or more portable storage articles of manufacture; one or more memory/storage components of a computing device; paper; and/or the like.

In another embodiment, the invention provides a method of providing a copy of program code, such as conferencing program 30 (FIG. 1), which enables a computer system to implement some or all of a process described herein. In this case, a computer system can process a copy of the program code to generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of the program code, which includes a computer system receiving the set of data signals described herein, and translating the set of data signals into a copy of the computer program fixed in at least one computer-readable medium. In either case, the set of data signals can be transmitted/received using any type of communications link.

In still another embodiment, the invention provides a method of generating a system for managing a conference call. In this case, a computer system, such as computer system 20 (FIG. 1), can be obtained (e.g., created, maintained, made available, etc.) and one or more components for performing a process described herein can be obtained (e.g., created, purchased, used, modified, etc.) and deployed to the computer system. To this extent, the deployment can comprise one or more of: (1) installing program code on a computing device; (2) adding one or more computing and/or I/O devices to the computer system; (3) incorporating and/or modifying the computer system to enable it to perform a process described herein; and/or the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A computer-implemented method of managing a conference call, the method comprising:
   receiving a request to send an external message to a set of other participants to the conference call from a first participant device of a first participant to the conference call;
   sending a response to the request to the first participant device, wherein the response includes external contact information for use by the first participant device in transmitting the external message to a device associated with at least one of the set of other participants using a messaging system available independent of the conference call;
   receiving a request to join the conference call from a participant; and
   sending a request for the external contact information for the participant in response to the request to join the conference call.

2. The method of claim 1, further comprising:
   sending a message desired inquiry to at least one participant in the set of other participants in response to receiving the request; and
   including external contact information for the at least one of the set of other participants in the response based on at least one of: a response to the message desired inquiry from the at least one of the set of other participants or a default action.

3. The method of claim 1, wherein the response further includes additional information for the at least one of the set of other participants, the additional information including at least one of: name information for the participant or alternative contact information for the participant.

4. The method of claim 1, wherein the external contact information for at least one of the set of other participants includes anonymous contact information, the method further comprising:
   receiving a request for message contact information from the messaging system, wherein the request includes data corresponding to the anonymous contact information; and
   providing message contact information for use by the messaging system in response to the request, wherein the message contact information corresponds to the anonymous contact information and enables the messaging system to transmit the external message to a device associated with the anonymous contact information.

5. The method of claim 1, wherein the at least one of the set of other participants is limited to participants currently connected to the conference call.

6. A method comprising:
   receiving, by a conference call system managing a conference call, a request to join the conference call from a participant;
   sending, by the conference call system, a request for the external contact information for the participant in response to the request to join the conference call;
   sending, from a computing device while the computing device is connected to the conference call, a request to send an external message to a set of other participants to the conference call for processing by the conference call system managing the conference call; and
   receiving, on the computing device, a response to the request from the conference call system, wherein the response includes external contact information for use in sending the external message to at least one of the set of other participants using a messaging system available to the computing device independent of the conference call.

7. The method of claim 6, further comprising:
   automatically initiating, on the computing device, preparation of the external message while the computing device is connected to the conference call; and
   automatically designating a set of destination contacts for the external message using the external contact information included in the response.

8. The method of claim 6, further comprising sending the external message from the computing device for processing by the messaging system during the conference call, wherein the external message is one of: a short message service (SMS) message or a multimedia messaging service (MMS) message.

9. The method of claim 6, wherein the external contact information for at least one of the set of other participants is anonymous contact information, and wherein the anonymous contact information enables the messaging system to obtain message contact information for providing the external message for presentation to the at least one of the set of other participants.

10. The method of claim 6, wherein the response includes additional information for at least one of the set of other participants, the method further comprising adding a new contact entry to a set of contact entries stored on the computing device using the additional information and the external contact information for the at least one of the set of other participants.

11. The method of claim 6, further comprising:
    receiving a message desired inquiry from the conference call system during the conference call; and
    providing a response to the conference call system in response to the message desired inquiry.

12. A system comprising:
    a computer system for managing a conference call by performing a method comprising:
       receiving a request to send an external message to a set of other participants to the conference call from a first participant device of a first participant to the conference call;
       sending a response to the request to the first participant device, wherein the response includes external contact information for use by the first participant device in transmitting the external message to a device associated with at least one of the set of other participants using a messaging system available independent of the conference call;
       receiving a request to join the conference call from a participant; and
       sending a request for the external contact information for the participant in response to the request to join the conference call.

13. The system of claim 12, the method further comprising:
- sending a message desired inquiry to at least one participant in the set of other participants in response to receiving the request; and
- including external contact information for the at least one of the set of other participants in the response based on at least one of: a response to the message desired inquiry from the at least one of the set of other participants or a default action.

14. The system of claim 12, wherein the response further includes additional information for the at least one of the set of other participants, the additional information including at least one of: name information for the participant or alternative contact information for the participant.

15. The system of claim 12, wherein the external contact information for at least one of the set of other participants includes anonymous contact information, the method further comprising:
- receiving a request for message contact information from the messaging system, wherein the request includes data corresponding to the anonymous contact information; and
- providing message contact information for use by the messaging system in response to the request, wherein the message contact information corresponds to the anonymous contact information and enables the messaging system to transmit the external message to a device associated with the anonymous contact information.

16. The system of claim 12, wherein the at least one of the set of other participants is limited to participants currently connected to the conference call.

\* \* \* \* \*